United States Patent [19]

Nourrcier, Jr.

[11] Patent Number: 5,615,004
[45] Date of Patent: Mar. 25, 1997

[54] LASER RANGE FINDER POWER MANAGEMENT SYSTEM

[75] Inventor: Charles E. Nourrcier, Jr., Lakewood, Calif.

[73] Assignee: Hughes Electronics, Los Angeles, Calif.

[21] Appl. No.: 364,322

[22] Filed: Dec. 27, 1994

[51] Int. Cl.⁶ .............................. G01C 3/08; H04B 1/16
[52] U.S. Cl. ...................... 356/4.01; 356/5.08; 455/343
[58] Field of Search .................................. 455/343, 127, 455/38.3; 356/4.01, 28.5, 5.08

[56] References Cited

U.S. PATENT DOCUMENTS

| | | |
|---|---|---|
| 4,346,989 | 8/1982 | Gort et al. . |
| 4,631,496 | 12/1986 | Borras et al. ........................ 455/343 |
| 4,733,961 | 3/1988 | Mooney . |
| 5,054,052 | 10/1991 | Nonami ................................ 455/343 |
| 5,389,930 | 2/1995 | Ono ...................................... 342/20 |
| 5,479,172 | 12/1995 | Smith et al. ........................ 342/51 |
| 5,487,181 | 1/1996 | Dailey et al. ....................... 455/343 |

Primary Examiner—Stephen C. Buczinski
Attorney, Agent, or Firm—Gordon R. Lindeen, III; Wanda K. Denson-Low

[57] ABSTRACT

A power management system for a laser range finder including a microcontroller which controls the supply of power by a series of linear regulators to analog electronics and digital electronics such that the respective electronics units are powered only during intervals when they require power during operation of the laser range finder. The linear regulators and a laser firing pulse generator circuit are powered by simplified DC/DC converter circuitry which is, in turn, supplied with power by a solid state front end circuit subject to control by the microcontroller and which includes first, second, and third transistors providing reverse voltage protection, overvoltage protection, and reduced power consumption.

21 Claims, 4 Drawing Sheets

LASER RANGE FINDER POWER MANAGEMENT SYSTEM

BACKGROUND OF THE INVENTION

1. Field of the Invention

The subject invention relates to laser systems and, more particularly, to an improved power management system for laser range finders.

2. Description of Related Art

Laser range finders are evolving into robust, modular, very small, low-cost devices. Cost is of primary importance and is affected by many factors. Not only is the electronics cost important, but the amount of power required directly affects the size and cost of the batteries, as well as the size of printed wiring boards.

Conventional technology for powering laser range finders employs multiple DC/DC converters and preregulators that are operating at all times. For reverse voltage protection, conventional systems use large, unreliable mechanical relays or inefficient series diodes for reverse voltage protection. Overvoltage protection is typically accomplished by large, expensive overdesigning. In conventional range finder systems, the entire apparatus is typically powered, even though some components may not need power 99.9% of the time.

OBJECTS AND SUMMARY OF THE INVENTION

It is therefore an object of the invention to improve laser range finder systems;

It is another object of the invention to improve apparatus for powering laser range finders;

It is another object of the invention to reduce the size, complexity, and cost of laser range finders and, particularly, apparatus for powering them;

It is another object of the invention to reduce the power consumption of laser range finders; and It is another object of the invention to improve overvoltage and reverse voltage protection circuitry for laser range finder power supplies.

According to the invention, the major functional modules of the laser range finder comprising its analog and digital circuitry are powered only when needed, thereby eliminating considerable power consumption. Since the duty cycle of the resulting system is typically much less than 1%, most of the costly conventional DC to DC power converters can be replaced with small, low-cost linear regulators, which also can be switched on as needed. The power management architecture according to another aspect of the invention further employs active solid state circuitry at the front end of the power supply for providing overvoltage and reverse voltage protection in a power efficient manner.

Thus, the preferred embodiment of the invention utilizes a low-cost power management approach for laser range finders, which not only reduces power consumption by more than an order of magnitude, but also incorporates unique solid state overvoltage protection and reverse voltage protection. The power management circuit of the preferred embodiment is a low-cost approach that allows the laser range finder to operate over very large swings in input power (5 volts to over 90 volts). This fact makes the laser range finder module very portable from system to system without regard to available power. For example, small battery operation, common 12-volt automotive battery, or military 24 volts can be used without having to change or modify the range finder electronics. The use of an active reverse voltage protection circuit eliminates over 2.5 watts of power dissipation from the system and eliminates large, costly, and unreliable relays.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a very power efficient, low-cost power management system for a laser range timer.

Figure 1:
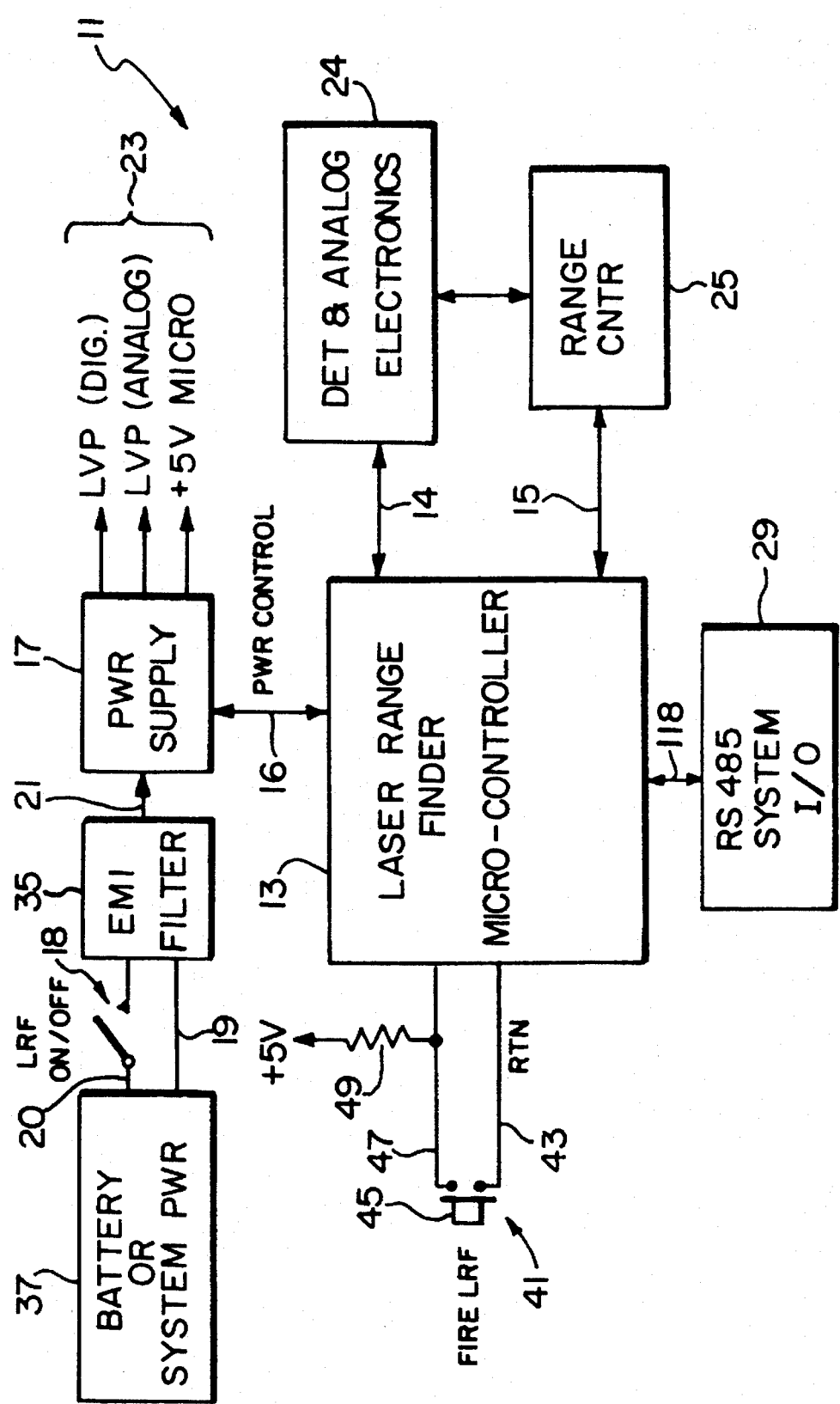
FIG. 1 is a schematic block diagram of a laser range finder power management system according to the preferred embodiment of the invention.

FIG. 1 illustrates a laser range finder system including a microcontroller 13, which communicates over a first bus 14 with laser range tinder detector and analog electronics 24 and over a second bus 15 with a laser range finder range counter and other associated digital electronics 25. The analog electronics 24 and digital electronics 25 may comprise conventional componentry of a conventional laser range finder. The microcontroller 13 may be a commercially-available component such as Part No. 87C552, as available from Philips Semiconductors, Sunnyvale, Calif.

The microcontroller 13 interfaces via a power control bus 16 with the power supply apparatus, which includes a battery 37, an EMI filter 35, and a power supply 17. The battery 37 is connected via first and second terminals 19, 20 and an LRF ON/OFF switch 18 to the EMI filter 35, which outputs a filtered voltage over signal path 21 to the power supply unit 17. The power supply 17 provides a plurality of constant low-voltage power outputs 23, to be described in further detail below.

The microcontroller 13 is actuated by a FIRE LRF switch 41, which includes a pushbutton 45 operative to close a circuit between respective first and second leads 43, 47. A reference voltage of 5 volts is supplied via a resistor 49, which is connected to the reference voltage source and to the second lead 47, which inputs to the microcontroller 13. An RS 485 system I/O 29 is connected via an I/O bus 118 to the microcontroller 13 for purposes of communicating between the microcontroller 13 and an associated fire control system.

Two activating switches are illustrated in FIG. 1, the LRF ON/OFF switch 18 and the FIRE LRF switch 41. The LRF ON/OFF switch 18 turns power to the laser range finder (LRF) on and off, while the pushbutton 45 of the FIRE LRF switch 41 fires the laser range finder.

Figure 2:
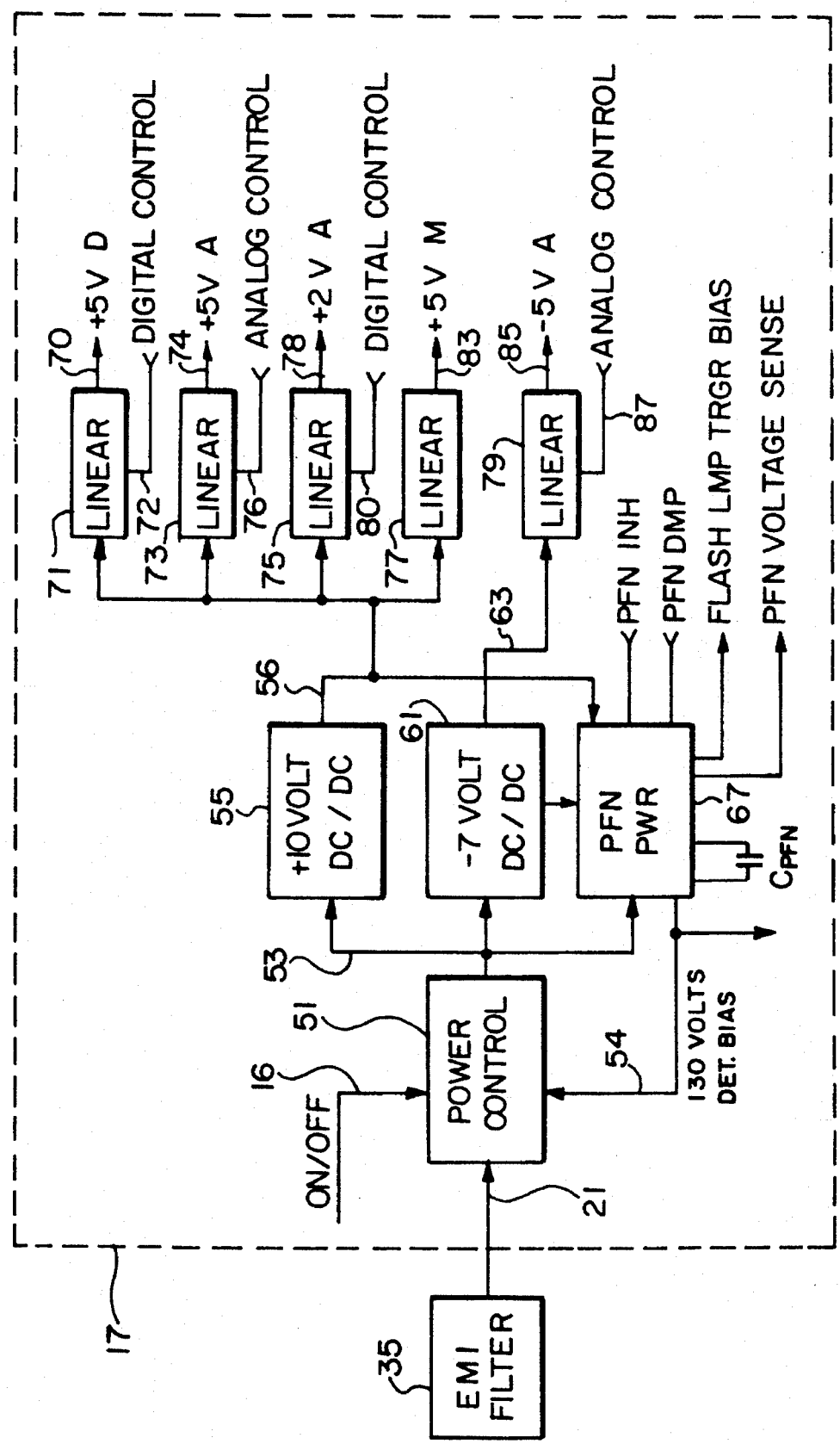
FIG. 2 is a circuit block diagram of power supply circuitry according to the preferred embodiment.

The structure of the power supply 17 is illustrated in more detail in FIG. 2. The power supply circuit 17 includes an EMI filter 35, which supplies a filtered voltage to a power control circuit 51. The power control circuit 51 controls the supply of power over a bus 53 to a 10-volt DC/DC converter 55, a 7-volt DC/DC converter 61, and a PFN power supply unit 67.

The 10-volt DC/DC converter 55 supplies a 10-volt DC output over an output bus 56 to a series of linear regulators 71, 73, 75, 77, and to the PFN power control unit 67. The 7-volt DC/DC booster converter 61 supplies a negative 7-volt DC output over an output bus 63 to a fifth linear regulator 79.

The DC/DC converters 55, 61 are conventional boost converters chosen due to their simplicity and low cost. As known in the art, the boost converter inductor is very small and cheap. Thus, the low voltage power supply (LVPS) consists of +10-volt and −7-volt DC/DC boost converters 55, 61.

The PFN power unit 67 powers a pulse forming network (PFN) including a PFN capacitor $C_{PFN}$ which is charged up to a voltage of, for example, 800 volts. This voltage is applied to a laser to generate optical energy and may vary from system to system, as may the value of $C_{PFN}$. The 800 volts is divided down within the power unit 67 using a zener diode to generate 130 volts, which is output on a signal line 54 to the power control unit 51 and to the detector and analog electronics 24. The 130 volts particularly provides a 130-volt bias voltage for the conventional range finder detector, which converts optical signals into electrical signals, as known in the art.

The PFN power unit 67 receives first and second inputs from the microcontroller 13, namely a PFN INH (inhibit) signal and a PFN DMP (dump) signal, and supplies first and second outputs, namely a flash lamp trigger bias signal (FLASH LMP TRGR BIAS) and a PFN Voltage Sense signal. The microcontroller 13 senses or samples the level of the voltage on the PFN capacitor $C_{PFN}$ via the Voltage Sense signal and stops the charging of that capacitor $C_{PFN}$ when its voltage reaches 800 volts. The microcontroller 13 can discharge the PFN capacitor $C_{PFN}$ via the PFN DMP signal, for example, for reset purposes when the system is turned off. The flash lamp trigger bias signal is generated to cause initial ionization in the laser prior to its firing, as known in the art.

The linear regulators 71, 73, 75, 77, 79 are used to power the various analog and digital circuitry 24, 25 of the laser range finder and the microcontroller 13. The first linear regulator 71 supplies a +5-volt output on a signal line 70 for powering the digital circuitry 25 and receives an input of a control signal from the microcontroller 13 on a signal line 72. The second linear regulator 73 supplies a +5-volt output on a signal line 74 for powering the analog circuitry 24 and receives a control signal from the microcontroller 13 on a signal line 76. The third linear regulator 75 supplies a +2-voltage on a signal line 78 for powering the digital circuitry 25 and receives a control signal on a signal line 80 from the microcontroller 13. The fifth linear regulator 79 supplies a +5-volt output on signal line 85 for use by analog circuitry 24 and receives a control signal from the microcontroller 13 on a signal line 87. The microcontroller 13 thus is enabled to selectively switch power on and off to the analog and digital circuitry 24, 25 by applying appropriate on/off control signals on respective signal lines 72, 76, 80, and 87.

The fourth linear regulator 77 supplies a +5-volt output on a signal line 85, which is used to power the microcontroller 13. Under full load, the microcontroller 13 uses less than 15 mA. Most of the time the microcontroller 13 is inactive or "asleep" and needs less than 5 mA.

According to the preferred embodiment, conventional linear regulators 71, 73, 75, 77, 79 with integrated on/off control are used. The efficiency of the linear regulators 71, 73, 75, 77, 79 is not an issue because the system duty cycle is typically less than 1%. Therefore, low cost and small size become more important than efficiency.

Figure 3:
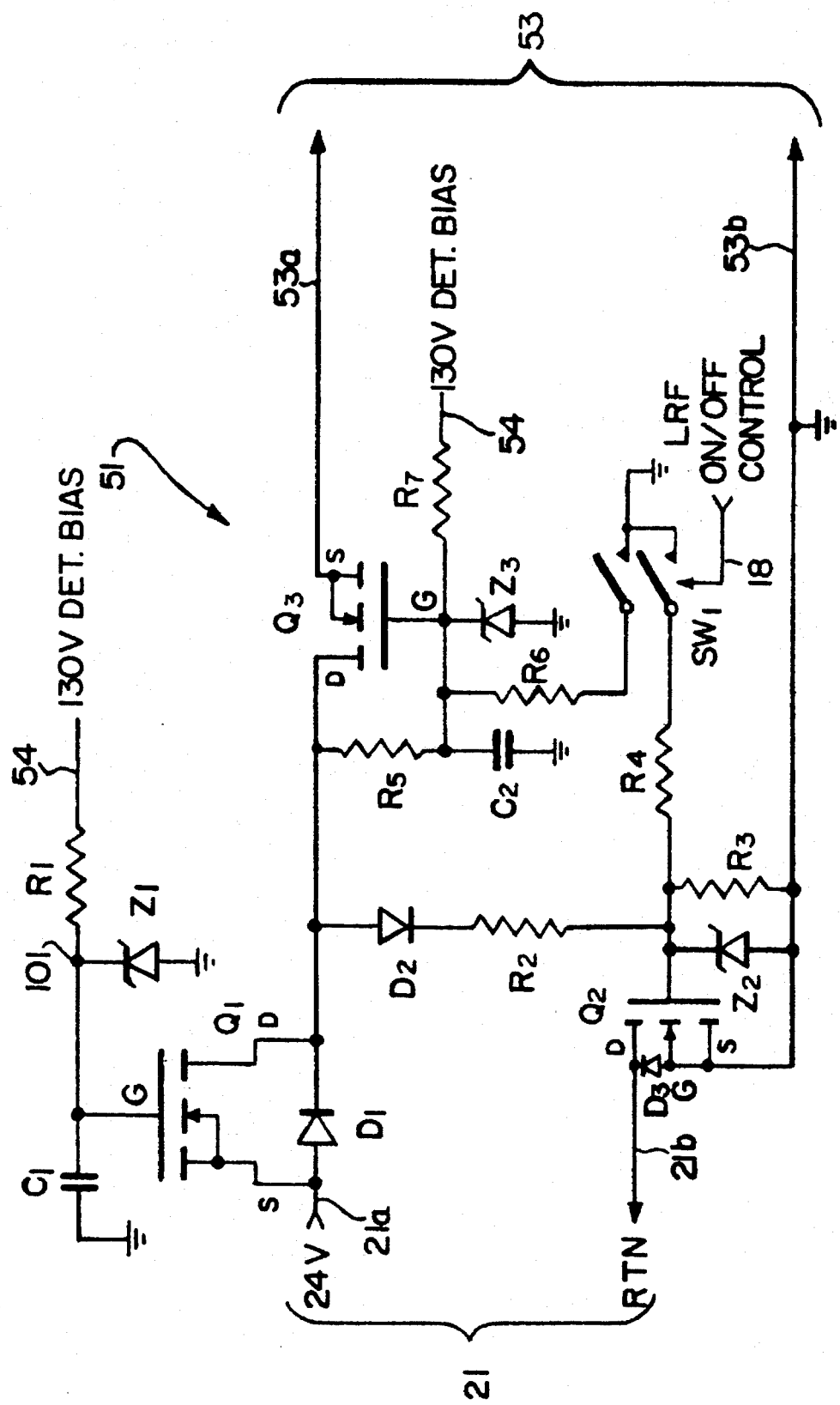
FIG. 3 is an electrical circuit diagram of front end power control circuitry according to the preferred embodiment.

FIG. 3 illustrates the front end power control circuit 51 in detail. As shown, the circuitry 51 includes first, second, and third N channel enhancement mode MOSFETs $Q_1$, $Q_3$, $Q_2$, each having a source S, a drain D, and a gate G. An ON/OFF control signal 18 is supplied to the circuitry 51 from the operator "master ON/OFF switch."

The first transistor $Q_1$ has its source S connected to the 24 volts DC supplied by the EMF filter 35 at input terminal 21a. A first diode $D_1$ is connected across the source S and drain D of the first transistor $Q_1$. $D_1$ is connected in parallel with the body diode of $Q_1$. In applications where the currents are low, the first diode $D_1$ can be eliminated. Without $D_1$, the circuit relies totally on the body diode of the first transistor $Q_1$. The gate G of the first transistor $Q_1$ is connected to the first terminal of a first capacitor $C_1$, whose opposite terminal is grounded. The gate G of the first transistor $Q_1$ is further connected to the junction 101 of a first resistor $R_1$ and the cathode of a first 35-volt zener diode $Z_1$ whose anode is grounded. The terminal of the resistor $R_1$ opposite the junction 101 is connected to a 130-volt supply. The drain D of the first transistor $Q_1$ is further connected to the anode of a second diode $D_2$, whose cathode is connected to a first terminal of a second resistor $R_2$.

The second transistor $Q_2$ has its drain D connected to the return (RTN) line 21b of the 24-volt input voltage. The gate G of the second transistor $Q_2$ is connected to the cathode of a second zener diode $Z_2$, to the second terminal of the second resistor $R_2$, and to the respective first terminals of third and fourth resistors $R_3$, $R_4$. The source S of the second transistor $Q_2$ is connected to the anode of the second zener diode $Z_2$ and to the second terminal of the third resistor $R_3$, and forms one output terminal 53b of the circuit 51. A third diode $D_3$ has its anode connected to the drain D of the second transistor $Q_2$ and its cathode connected to the source S of the second transistor $Q_2$. In applications where the currents are low, the third diode $D_3$ can be eliminated. Without the third diode $D_3$, the circuit relies totally on the body diode of the second transistor $Q_2$.

The third transistor $Q_3$ has its drain D connected to the drain D of the first transistor $Q_1$ and to a first terminal of a fifth resistor $R_5$. The second terminal of the fifth resistor $R_5$ is connected to the gate G of the third transistor $Q_3$ and to the first terminal of a second capacitor $C_2$ whose second terminal is grounded. The gate G of the first transistor $Q_3$ is further connected to the cathode of a third zener diode $Z_3$, to the first terminal of a sixth resistor $R_6$ and to the first terminal of a seventh resistor $R_7$. The anode of the third zener diode $Z_3$ is grounded.

The second terminals of the sixth and seventh resistors $R_6$, $R_7$ are respectively connected to a switch $SW_1$ and to the 130-volt supply. The switch $SW_1$ has a first terminal connected to the second terminal of the fourth resistor $R_4$ and a second terminal connected to the second terminal of the sixth resistor $R_6$, and a control terminal connected to bus 16 so as to receive the ON/OFF control signal from the operator. The source S of the third transistor $Q_3$ forms the output terminal 53a of the circuit 51.

The front end power control circuit 51 of FIG. 3 provides reverse voltage protection, as well as overvoltage protection, via a 100% solid state circuit. The circuit 51 further provides low current ON/OFF control, provided through use of the switch $SW_1$. Actuating this switch $SW_1$ shorts the gates G of the second and third transistors $Q_2$ and $Q_3$ to ground via resistors $R_4$, $R_6$, turning off the supply of voltage across the output terminals 53a, 53b of the circuit 51. The third transistor $Q_3$ thus enables turning the system off.

Reverse voltage protection is provided by the first diode $D_1$, which prevents current from flowing in the wrong direction at terminal 21a. The third transistor $Q_3$ also will not conduct current in the wrong direction. When the system powers up, the first transistor $Q_1$ is off and all current flows through the first diode $D_1$. After initial power-up, the 130-volts from the PFN unit 67 is applied, which turns the first transistor $Q_1$ on and shorts out the first diode $D_1$. The first transistor $Q_1$ thereafter saves power by shorting out diode $D_1$. The input current is then exposed only to the small "on" resistance (0.1Ω) of the first transistor $Q_1$. This action improves overall efficiency by eliminating the forward voltage drop of the first diode $D_1$ during normal operation.

The second transistor $Q_2$ supplies reverse voltage protection to the 24-volt return line, terminal 21b. The second transistor $Q_2$ is normally off so current cannot flow in at terminal 21b, but can flow out via the third diode $D_3$, thereby providing a return path. When the first diode $D_1$ conducts, voltage is applied to the gate G of the second transistor $Q_2$ via the second diode $D_2$ and the current limiting second resistor $R_2$. The second zener diode $Z_2$ limits the voltage which the gate G of the second transistor $Q_2$ will see to 35 volts. The application of voltage to the gate G of the second transistor $Q_2$ causes the second transistor $Q_2$ to come on, shorting the third diode $D_3$ and providing a low resistance return path. The second transistor $Q_2$ thus comes on more quickly than the first transistor $Q_1$.

The third transistor $Q_3$ additionally provides overvoltage protection and reverse voltage protection. The third transistor $Q_3$ becomes a variable resistor when the input voltage across the terminals 21a and 21b exceeds 35 volts. More specifically, when the voltage on the drain D of the third transistor $Q_3$ exceeds the 35-volt gate voltage dictated by the third zener diode $Z_3$, the third transistor $Q_3$ begins to turn off, holding its source voltage to 35 volts or less. Thus, the third transistor $Q_3$ will drop enough voltage to prevent an overvoltage condition from occurring within the system. The first transistor $Q_1$ provides similar protection until it is turned off, at which point the third transistor $Q_3$ must drop all of the voltage other than the 0.7 volt dropped by the first diode $D_1$. Such overvoltage protection is an important feature because it allows the circuitry to utilize lower voltage (cheaper) components such as capacitors. The overvoltage set point is achieved through the third zener diode $Z_3$ and, to a lesser extent, the first zener diode $Z_1$, and can be set at any point. The power converters 55, 61 downstream of this circuit preferably can operate up to 40 volts. Therefore, the 35-volt zeners $Z_1$, $Z_2$, $Z_3$ offer some design margin.

The third transistor $Q_3$ provides reverse voltage protection by preventing current from flowing in the reverse direction.

The third transistor $Q_3$ is required for reverse voltage protection because the body diode of the first transistor $Q_1$ will conduct current under reverse voltage conditions.

The overall operation of the power management system of the preferred embodiment will now be described in further detail in conjunction with FIG. 4. As shown, the system 11 is first enabled by application of battery power, step 103, by closing the LRF ON/OFF switch 18. In response, switch $SW_1$ closes and charges the PFN capacitor $C_{PFN}$, step 105 of FIG. 4. The range finder analog and digital electronics 24, 25 are unpowered during this time and remain so until subsequently activated by the microcontroller 13. At completion of step 105, the microcontroller 13 is in a low power "sleep" state and the system is using less than 10 mA of battery current. The microcontroller 13 can only be awakened by the FIRE LRF button 45, step 117, or an internal watchdog timer, step 111.

The watchdog timer periodically wakes up the microcontroller 13 if it has been in the sleep state for an extended period of time. To do this, the watchdog timer generates an interrupt, which causes the microcontroller 13 to perform a background diagnostic and calibration routine, step 115, primarily to keep the laser range finder receiver calibrated when the range finder is not being operated.

Figure 4:
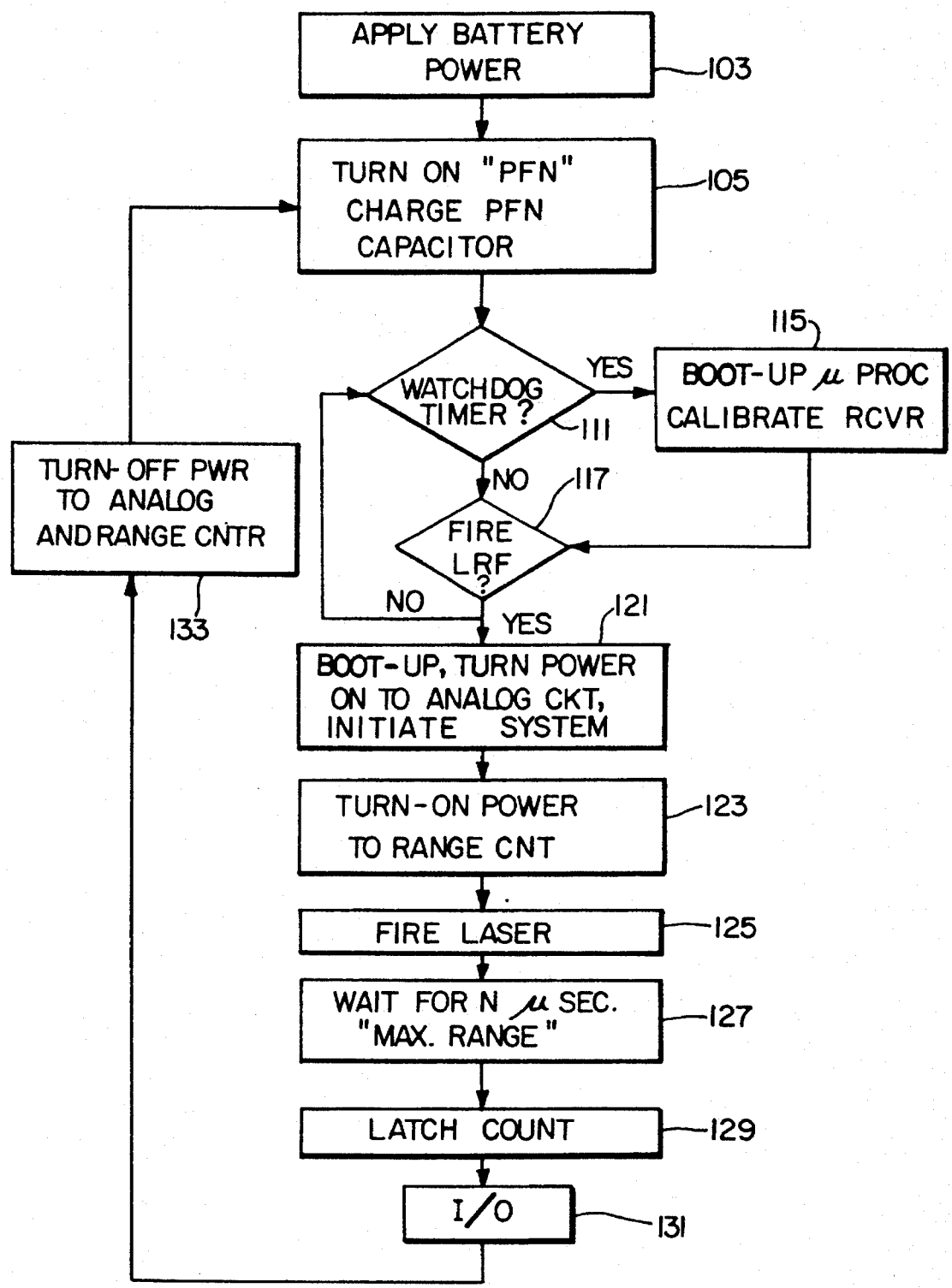
FIG. 4 is a flowchart useful in illustrating the structure and operation of the power management circuitry of the preferred embodiment.

The FIRE LRF signal issues an interrupt to the microcontroller 13 and causes the microcontroller 13 to activate a laser ranging sequence, beginning with step 121 of FIG. 4. In step 121, the microcontroller 13 boots up, turns on the analog circuitry 24 via signal lines 76, 87, and initializes the system. After these operations, power is turned on to the digital range counter circuitry 25, step 123. The laser is then fired, step 125, and the return pulse detected. The microcontroller 13 delays for an interval equal to the maximum count of the range counter, step 127, and then latches the count of the range counter, step 129. The count is then output through the system I/O 29 to associated fire control circuitry, step 131. The microcontroller 13 then turns off the power to the analog circuitry 24 and the digital circuitry 25, step 133, and returns to recharge the PFN capacitor $C_{PFN}$ for the next firing operation before reentering the "sleep" state.

The range counter which forms part of digital electronics 25 is only needed for 100 microseconds each time a laser pulse is sent. Therefore, the range counter and associated digital electronics 25 are powered separately by the linear regulators 71, 75. The objective is to activate the range counter electronics 25 only as necessary. The analog electronics 24 needs to be powered for other functions such as detector bias, threshold, offset nulling, and test purposes. These considerations require the analog electronics 24 to be powered during periods of time when the range counter electronics 25 is not needed. The microcontroller 13 is therefore programmed to track the laser range finder sequence and to activate the linear regulators 71, etc. only when their particular associated analog or digital circuitry requires power. Thus, the microcontroller 13 acts as the system state machine, sequencing power on and off to various functions as needed.

The preferred embodiment just described exhibits numerous advantages. Since the system is triggered from a FIRE LRF interrupt, the system is not pulse repetition frequency (PRF) sensitive and can be slaved to an external trigger. This is important if the laser needs to fire or operate during some other benign system state. For example, the laser system generally produces large amounts of EMI. When operated with an FLIR (forward looking infrared) system, EMI can show up in the image or, worse, cause problems with scene-based nonuniformity correction (NUC) algorithms. The FLIR can send a signal to the LRF commanding the laser system to go through a ranging sequence during a line blank time or frame retrace time, thus not effecting the FLIR image.

The invention further allows the commercial exploitation of high performance, battery-powered laser range finder systems utilizing off-the-shelf low-cost commercial ICs. Applications include automotive obstacle avoidance, commercial and industrial laser ranging systems, and sport applications. Sport applications may include a hunter using an integrated laser range finder and rifle scope.

Power savings through implementation of the preferred embodiment is also considerable. For example, in one embodiment according to the invention, over 7.5 watts from the range counter and 5 watts from the receiver hybrid is saved, for a 1-Hz system.

Those skilled in the art will appreciate that various adaptations and modifications of the just-described preferred embodiment can be configured without departing from the scope and spirit of the invention, particularly since the architecture of FIG. 1 is completely transparent to laser technology. For example, a diode pumped range finder system would not require charging a PFN capacitor. The invention can thus be applied to such a system with changes required only in some of the detailed operations of the preferred embodiment. Therefore, it is to be understood that, within the scope of the appended claims, the invention may be practiced other than as specifically described herein.

What is claimed is:

1. For use with a laser range finder system having digital circuitry and analog circuitry, the power management apparatus comprising:

power supply means for selectively supplying power to said digital circuitry and to said analog circuitry in response to a plurality of power control signals; and programmed controller means for selectively supplying said plurality of power control signals to said power supply means so as to cause supply of power by said power supply means to said digital circuitry only when said digital circuitry needs power to be supplied thereto and so as to cause supply of power to said analog circuitry only when said analog circuitry needs power to be supplied thereto.

2. The apparatus of claim 1 wherein said power supply means comprises first linear regulator circuit means for powering said digital circuitry and second linear regulator circuit means for powering said analog circuitry, and wherein said programmed controller means enables said first and second linear regulator means to respectively supply power to said digital circuitry and said analog circuitry during selected time intervals.

3. The apparatus of claim 2 wherein said power supply means further includes a means for developing and storing a laser firing voltage, and wherein said programmed controller means controls development of said firing voltage by said means for developing and storing.

4. The apparatus of claim 3 wherein said means for developing and storing further includes means for developing a detector bias voltage from the laser firing voltage.

5. The apparatus of claim 2 wherein said power supply means further includes DC/DC converter means for supplying power to said first and second linear regulator circuit means.

6. The apparatus of claim 5 wherein said power supply means includes front end circuit means for supplying power to said DC/DC converter means and for providing reverse voltage protection and overvoltage protection.

7. The apparatus of claim 6 wherein said front end circuit means has an input line and a return line and further comprises:

a first diode means for preventing current flow in a selected direction in said input line; and first transistor means responsive to supply of a detector bias voltage for shorting said first diode means and for preventing current flow in said selected direction.

8. The apparatus of claim 7 wherein said front end circuit means further includes:

a second diode means for preventing current flow into said return line; and second transistor means responsive to application of a voltage to said first diode means to turn on and short out said second diode means and thereafter prevent current flow into said return line.

9. The apparatus of claim 8 wherein said front end circuit means further includes third transistor means located between said input terminal and an output terminal of said front end circuit means for limiting the voltage applied to said output terminal.

10. The apparatus of claim 9 wherein said third transistor means further is responsive to a signal from said power control means to disable supply of power from said front end circuit means to said DC/DC converter means.

11. The apparatus of claim 10 wherein said third transistor means comprises a field effect transistor having a zener diode connected to its gate.

12. The apparatus of claim 4 further comprising front end circuit means having an input line and a return line, said front end circuit means including a first diode means for preventing current flow in a selected direction in said input line and first transistor means responsive to supply of a detector bias voltage for shorting said first diode means and for preventing current flow in said selected direction.

13. The apparatus of claim 12 wherein said front end circuit means further includes a second diode means for preventing current flow into said return line and second transistor means responsive to application of voltage to said first diode means to turn on and short out said second diode means and thereafter prevent current flow into said return line.

14. The apparatus of claim 13 wherein said front end circuit means further includes third transistor means located between said input terminal and output terminal of said front end circuit means for limiting the voltage applied to said output terminal.

15. The apparatus of claim 14 wherein said third transistor means further is responsive to a signal from said power control means to disable supply of power to said output terminal.

16. The apparatus of claim 15 wherein said third transistor means comprises a field effect transistor having a zener diode connected to its gate.

17. A front end circuit having an input and return line and a pair of output terminals for the power supply of a laser range finder including a detector range finder requiring a bias voltage comprising:

a first diode means connected to an input terminal of said circuit for preventing current flow in a selected direction and first transistor means responsive to supply of a detector bias voltage to said detector for shorting said first diode means and for preventing current flow in said selected direction;

a second diode means for preventing current flow into the return line of said front end means and second transistor means responsive to application of voltage to said first diode means to turn on and short out said second diode means, and thereafter prevent current flow into said return line; and third transistor means connected between said input terminal and an output terminal of said front end means for limiting the voltage applied to said output terminal.

18. The circuit of claim 17 wherein said third transistor means is further responsive to a signal from said power control means to disable supply of power to said output terminal.

19. The circuit of claim 18 wherein said third transistor means further comprises:

a field effect transistor having a gate; and a zener diode connected to said gate.

20. For use with a laser range finder system having digital circuitry and analog circuitry, the power management apparatus comprising:

a power supply including a plurality of linear regulators, each responsive to a control signal to switch at least a first voltage to said digital circuitry and at least a second voltage to said analog circuitry; and a programmable digital controller circuit programmed to supply respective control signals to said linear regulators so as to supply power to said digital circuitry only when said digital circuitry requires power and so as to supply power to said analog circuitry only when said analog circuitry requires power.

21. A laser range finder system comprising:

digital range counter circuitry;

analog range finder circuitry;

power supply means for selectively providing power to said digital range counter circuitry and said analog range finder circuitry in response to a plurality of power control signals; and controller means for selectively providing said plurality of power control signals to said power supply means so as to cause supply of power to said digital range counter circuitry only when said digital range counter circuitry needs power and so as to supply power to said analog range finder circuitry only when said analog range finder circuitry needs power.

* * * * *